Jan. 1, 1929.
Re. 17,183
F. J. SCHLEICHER
PAPER BOX
Original Filed May 7, 1926
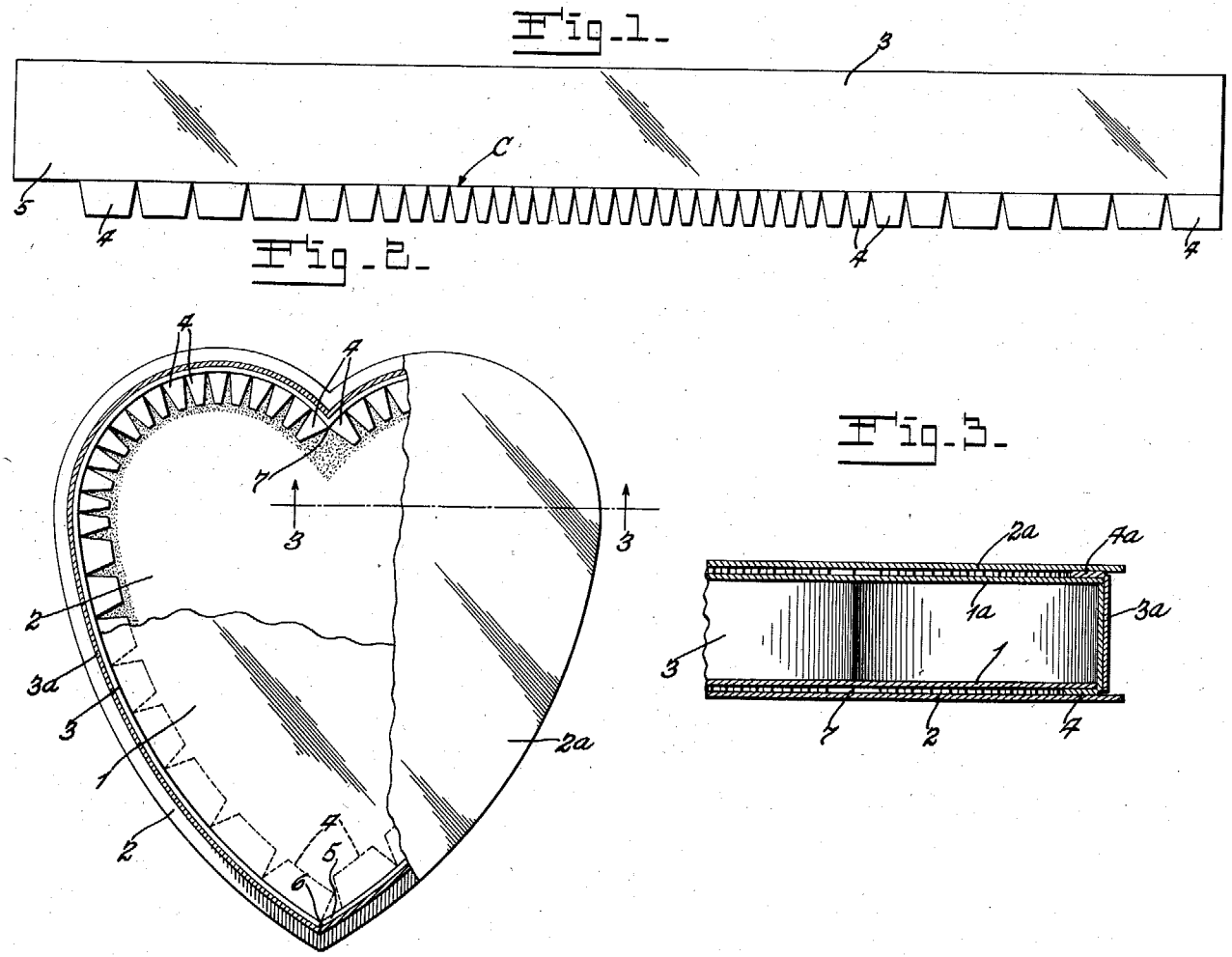
Inventor:
Frank J. Schleicher,
by Kippey & Kingsland,
His Attorneys Reissued Jan. 1, 1929.

Re. 17,183

UNITED STATES PATENT OFFICE.

FRANK J. SCHLEICHER, OF UNIVERSITY CITY, MISSOURI.

PAPER BOX.

Original No. 1,631,225, dated June 7, 1927, Serial No. 107,406, filed May 7, 1926. Application for reissue filed November 19, 1928. Serial No. 320,501.

My invention relates to paper or cardboard box construction and consists in an improved box having curved sides. My invention is particularly adapted for use in making heart-shaped boxes and I illustrate the application of my invention to such boxes in the accompanying drawings and describe such an application below.

It has been the practice heretofore to make boxes of this kind by providing a flat sheet for the base, having the desired contour; providing a rectangular strip for the side of the box; placing the latter about a heart-shaped form applied to the base sheet and then connecting the base and side sheets by means of a strip of cloth or paper covered with glue, the same being bent to conform to the angle between the side sheet and base sheet. This has always been a manual operation and heretofore, although rectangular boxes have been made rapidly and cheaply by machinery, there has been no cardboard box with curved sides produced which could be turned out by machinery.

Objects of my invention are to produce such a box, to eliminate the necessity of the base and side attaching strip which has heretofore been used and by eliminating this unsightly and unsanitary strip, to avoid the necessity of providing a cover sheet for the strip and adjacent portions of the box, thereby rendering it possible to make a box out of coated cardboard stock which further cheapens the cost of such boxes without detracting from their appearance.

Another object of the invention is to provide an improved box of the type mentioned wherein the strip forming the box side has defined parts designed and constructed to be placed in definite positions against a bottom or top wall in order that such strips may be attached to the bottom and top walls, respectively, in a definite predetermined relationship rapidly and with facility. Thus, the cost of manufacture is greatly reduced, and the output correspondingly increased and the manufacture largely facilitated.

In the accompanying drawing which illustrates a selected embodiment of my invention:—

Fig. 1 is a detail of the rectangular strip from which the box side is formed.

Fig. 2 is a top view of my improved box, parts of the same being broken away the more clearly to illustrate the structure of the same.

Fig. 3 is a vertical section taken on the line 3—3 of Fig. 1.

The box base preferably consists of two sheets 1 and 2, each having a heart-shaped contour; that is, each of said sheets has a point or corner 6 at one side and in its opposite edge a notch 7 formed by diverging walls. The outer base sheet 2 is somewhat larger than the inner base sheet 1, so that when the box is completed the outer base sheet 2 projects outwardly beyond the side wall of the box and guards and shields the joint of the side wall 3 with the bottom wall. The box side wall 3 is preferably formed from a flexible rectangular strip, one edge of which is cut so as to form a plurality of tongues 4. These tongues may be bent at right angles to the body of the strip, as indicated in Figs. 2 and 3 and extended under and glued to the under side of the inner base sheet 1, the body of the side forming strip 3 being bent to follow the contour of the base sheet 1. As clearly shown in Fig. 1, there is an elongation 5 at one end of said strip on which no tongue is formed, the first tongue 4 adjacent to this end of the strip being spaced an appropriate distance from the end of the strip elongation 5; whereas the tongue 4 adjacent to the opposite end of the strip is at or quite close to the end of the strip. The strip 3 is creased along a line C which is in continuation of one side edge of the elongation 5 and which defines the union of the tongues 4 with the bottom of the strip 3. This crease C is formed before the tongues are bent against the under side of the inner base sheet 1 and facilitates and guides the binding.

By reference to Fig. 2 the novel construction of this strip 3, whereby its assembly in connection with the base sheets of the box is greatly expedited and facilitated so that the cost of manufacture is largely reduced and the output correspondingly increased, will be apparent and the advantage thereof plain enough. Said strip 3 has the end of the elongation 5 at the point 6 of the base sheet 1 abutting or close to the opposite end of the strip 3; so that both ends of said strip are at or near the point 6. Essentially, the strip 3 is constructed so that the point of the angle of the strip 3 which is within the notch 7 of the heart-shaped base sheet opposite from the point 6 is in exact registration with the cut separating two of the tongues 4. Thus, the two adjacent tongues 4 which are at the angle 7 will not interfere with the bending of the strip 3 about the edge of the base sheet 1. That is to say, the location of one of the ends of the strip 3 so that said end is at the corner 6 will essentially locate the strip 3 properly so that the bending of said strip to form the angle 7 will not be obstructed by any tongue 4. For, the construction is such that the end of the strip 3 constitutes a defined part to be placed in a definite position against a designated part of the base sheet 1 so that no tongue 4 will be opposite the sharp point of the notch 7; and so that a cut separating two adjacent tongues 4 must of necessity be opposite the point of said notch 7. This is because the cut between a pair of the tongues 4 is required to register with the point of said notch 7 in the base sheet 1 that is opposite the point 6 to enable the strip 3 to bend properly. After the side wall strip 3 has been assembled in connection with the inner base sheet 1; that is, after the side sheet 3 has been bent around the edge of the inner base sheet 1 in the manner described; and, after the tongues 4 have been glued to the under side of said inner base sheet 1, the outer base sheet 2 which is larger than the inner base sheet 1 is brought into the assembly by gluing the same to the lower faces of the tongues 4. The edge of the outer base sheet 2 which projects beyond the wall 3 affords adequate protection along the line C on which the tongues 4 are bent.

In the embodiment shown the tongues 4 are of various widths as the larger curves adjacent to the point 6 of the box may accommodate wider tongues, but the invention is not limited to such construction.

As clearly apparent in Fig. 2 the spacing of the adjacent tongue 4 from the end of the elongation 5 permits the tongue 4 at the opposite end of the strip to be bent to proper position against the under side of the base sheet 1 without overlapping said other strip 4.

I have described the box structure but it will be understood that the lid structure will be the same and Figs. 2 and 3 illustrate a box and lid assembled with each other. The parts previously referred to are practically duplicated in the lid and are numbered $1^a$, $2^a$, $3^a$, and $4^a$ in order to correspond to the parts of the box numbered 1, 2, 3, and 4, respectively.

I direct attention to the fact that if the inner base 1 be coated on its upper face and the outer base sheet 2 be coated on its outer face, and the side strip 3 be coated on both of its faces the box will have an attractive finish without any cover sheets being applied.

Obviously the box side and base may be assembled on a box making machine adapted to assemble rectangular boxes, it only being necessary to modify the cooperating parts of the machine for the heart-shaped contours desired. Of course, curved boxes other than the heart-shaped box illustrated may be made similarly by varying the details of the parts as may be required, and I contemplate the exclusive use of such modifications of the details which may be suggested in the commercial development of my invention and as are included in the scope of my claims.

I claim:—

1. A box comprising a bottom wall having an angular notch in one edge, in combination with a strip forming a wall around and in contact with the edge of said bottom wall; tongues on one edge of said strip lapping and attached to a marginal portion of said first named wall, two adjacent ones of said tongues being in a relationship in which the space separating said two tongues is directly at an opposite the angle of said notch; and means spaced from said notch and said two adjacent tongues guiding the location of said strip about said wall for attachment to said wall by all of said tongues as aforesaid.

2. A box comprising a bottom wall having an angular notch in one edge, in combination with a strip forming a wall around and in contact with the edge of said bottom wall; tongues on one edge of said strip lapping and attached to a marginal portion of said first named wall, two adjacent ones of said tongues being in a relationship in which the space separating said two tongues is directly at and opposite the angle of said notch; means spaced from said notch and said two adjacent tongues guiding the location of said strip about said wall for attachment to said wall by all of said tongues as aforesaid; and an additional wall attached to said tongues and cooperating with said first named wall to enclose all of said tongues between them, said additional wall having its marginal edge projecting beyond the surface of said wall formed by said strip.

3. A box comprising a bottom wall having a notch in one edge and a defined point in one marginal surface spaced from said notch, said notch having a sharp corner; and a wall-forming strip having a defined part located against the edge of said wall at said defined point, said strip being bent around the marginal edge of said first named wall and sharply into said notch; tongues projecting from said strip in a relationship to said defined part whereby a line separating two of said tongues will necessarily be at the point of said notch whenever said defined part of said strip is located at said defined point on said wall to permit sharp bending of said strip into said notch; and means securing said tongues to one of the surfaces of said wall.

4. A box comprising an inner bottom wall having a notch in one edge and a defined point on one marginal surface spaced from said notch, said notch having a sharp corner; and a wall-forming strip having a defined part located against the edge of said wall adjacent to said defined point, said strip being bent around the marginal edge of said first named wall and sharply into said notch; tongues projecting from said strip in a relationship to said defined part whereby a line separating two of said tongues will necessarily be at the point of said notch whenever said defined part of said strip is located at said defined point on said wall to permit sharp bending of said strip into said notch; means securing said tongues to the outer side of said wall; and an outer wall of similar contour to said first wall secured to said tongues and having its marginal edge projecting beyond the outer surface of said wall-forming strip.

5. A box comprising a bottom wall having a notch in one edge formed with a sharp corner; a wall-forming strip bent around the marginal edge of said wall and sharply into said corner of said notch; tongues projecting from said strip against a plane surface of said wall; means guiding the proper positioning of said strip about said wall to prevent said strip from being placed in a position in which any one of said tongues crosses said sharp corner of said notch; and means securing said tongues to said wall.

6. A box comprising a bottom wall having a notch in one edge formed with a sharp corner; a wall-forming strip bent around the marginal edge of said wall and sharply into said corner of said notch; tongues projecting from said strip against a plane surface of said wall; means guiding the proper positioning of said strip about said wall to prevent said strip from being placed in a position in which any one of said tongues crosses said sharp corner of said notch; means securing said tongues to said wall; and an outer wall of the same contour as said first named wall attached to said tongues.

7. A box comprising a bottom wall having a notch in one edge formed with a sharp corner; a wall-forming strip bent around the marginal edge of said wall and sharply into said corner of said notch; tongues projecting from said strip against a plane surface of said wall; means guiding the proper positioning of said strip about said wall to prevent said strip from being placed in a position in which any one of said tongues crosses said sharp corner of said notch; means securing said tongues to said wall; and an outer wall of the same contour as said first named wall attached to said tongues and having its marginal edge projecting laterally beyond and guarding the union of said strip and said tongues.

8. A box comprising a bottom wall having a pointed corner and having a notch in one edge spaced from said pointed corner and formed with a sharp corner; a wall-forming strip bent around said wall and sharply into said notch; tongues on said strip extending under and secured to said bottom wall; and an elongation at one end of said strip beyond said tongues and having its end located adjacent to said corner of said bottom wall, the other end of said strip being adjacent to one of said tongues which is secured to the under side of said wall adjacent to said elongation.

9. A heart-shaped cardboard box comprising a base sheet with a heart-shaped contour, and a side for said box comprising a rectangular strip notched along one edge with the portions between said notches bent inwardly for attachment to said base sheet, the body of said strip being bent to extend around the edge of said base sheet, the distances between said notches increasing along the sides of the box adjacent to its point and decreasing along the sharper curves opposite the point.

FRANK J. SCHLEICHER.

4

CERTIFICATE OF CORRECTION.

Reissue Patent No. 17,183. Granted January 1, 1929, to

FRANK J. SCHLEICHER.

It is hereby certified that error appears in the printed specification of the above numbered patent requiring correction as follows: Page 2, line 88, claim 1, for the word "an" read "and"; and that the said Letters Patent should be read with this correction therein that the same may conform to the record of the case in the Patent Office.

Signed and sealed this 5th day of February, A. D. 1929.

M. J. Moore,
Acting Commissioner of Patents.

(Seal)